Patented Aug. 16, 1949

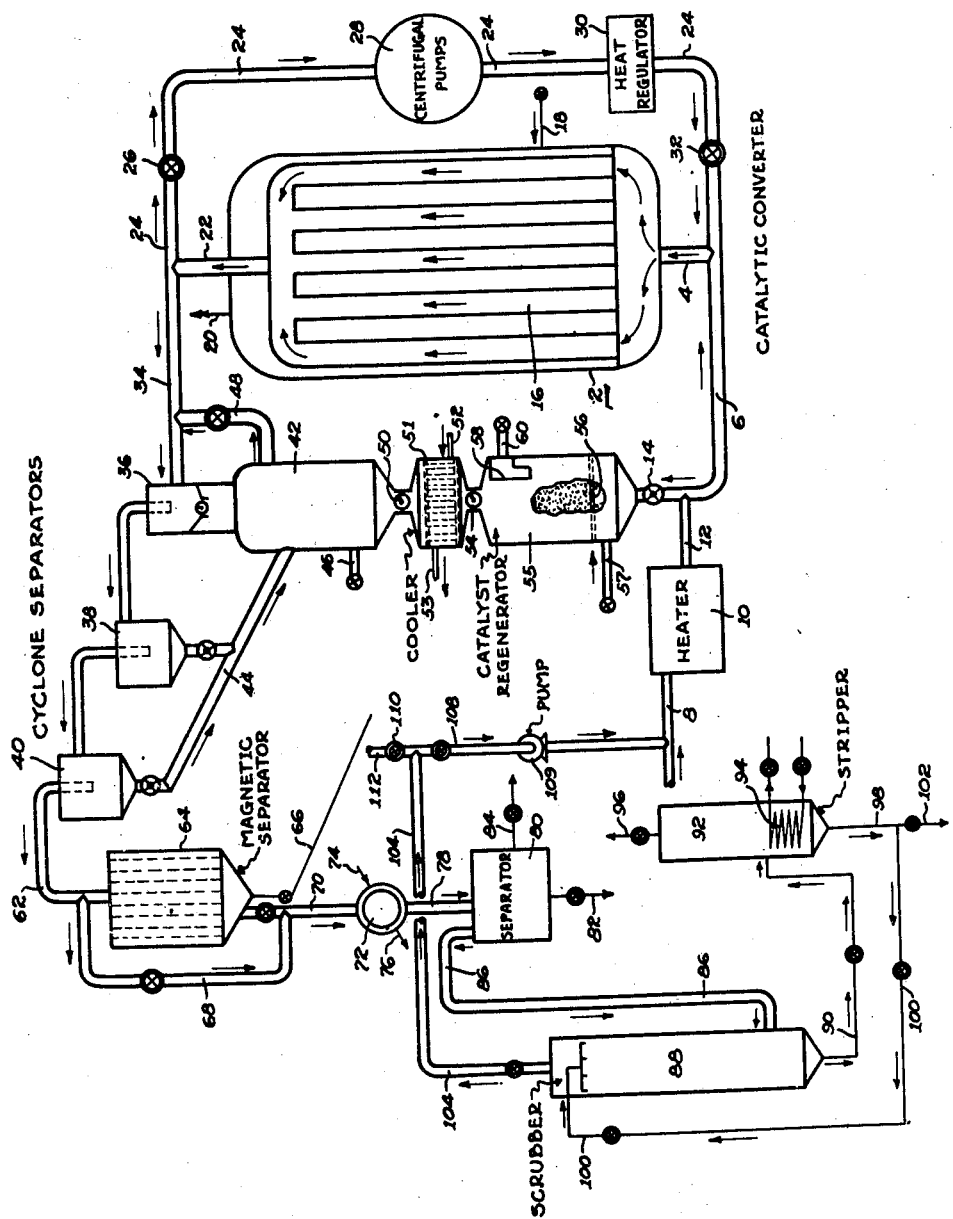

2,478,899

UNITED STATES PATENT OFFICE 2,478,899

REACTIVATION OF CATALYSTS IN HYDROCARBON SYNTHESIS

Edmond L. d'Ouville, Pittsburgh, Pa., assignor to Koppers Company, Inc., Pittsburgh, Pa., a corporation of Delaware Application April 27, 1945, Serial No. 590,566

2 Claims. (Cl. 260—449.6)

1

The present invention relates to the synthesis of hydrocarbons, particularly hydrocarbons of more than one carbon atom per molecule, from carbon monoxide and hydrogen by a catalytic process. The invention has particular reference to the reactivation of catalysts employed in the said process.

The major catalysts customarily employed in the synthesis of hydrocarbons from hydrogen and the oxides of carbon are nickel, cobalt and iron and their oxides. The active metal and its oxide may be supported on a material of large surface such as kieselguhr, silica gel, activated alumina, or acid-treated clays. It is known to employ along with the above metals or metal oxides minor amounts of promoter oxides such as thoria, magnesia, oxides of the alkaline earths or other non-reducible oxides. It is also known to include in the catalyst minor amounts of readily reducible oxides such as those of copper or silver which oxides lower the temperature of the reduction that is necessary partially to reduce, in a stream of hydrogen, the employed oxide of cobalt, nickel or iron. In the case of nickel and cobalt the reduction temperature is usually between 350° and 450° C. However, the reduction can be carried out at temperatures below 350° C. if higher than atmospheric pressure or a readily reducible metal oxide is used. Iron catalysts are reducible at temperatures between about 600° and 700° C.; the said reductions are not carried to completion, the optimum degree of reduction being highest for nickel and lowest for iron. The reduction can be carried out in a vessel designed especially for the reduction step and be transferred before use into the synthesis zone or it can be reduced in situ if the temperature of reduction is lowered by the described means or if the converter is suitable both for catalytic conversion and also for the higher temperatures of reduction.

Following the reduction period the catalyst is brought into contact with oxides of carbon and hydrogen at carefully controlled temperatures. During this preliminary treatment with carbon monoxide and hydrogen, the principal hydrocarbon synthesized is methane. During this period the metal of the catalyst undergoes a partial transition into the corresponding metal carbide. Thereafter the so-treated catalyst is suitable for synthesis of hydrocarbons of more than one car-

2 bon atom. In this state the catalyst is commonly considered to comprise a metal selected from the group consisting in nickel, cobalt, and iron; the oxide of the metal, the carbide of the metal, and chemi-sorbed hydrogen. The activity of the catalyst is a maximum when these components are present in optimum proportions.

Although the catalyst remains active for relatively long periods, depending upon the completeness of which sulfur or like catalyst poisons are removed from the synthesis gas, the temperature and pressure used, and the type of operation, its activity ultimately is reduced by impregnation of the catalyst with relatively non-volatile products of synthesis such as relatively high melting waxes.

Several methods have in the past been devised to dewax the catalyst and otherwise partially restore its activity. It is known, for example, to pass nitrogen or other inert gases at a temperature above that used in the synthesis through the deactivated catalyst and thereby remove the restrictive coating of waxy material. It has further been found that, when hydrogen passes over the deactivated catalyst at the temperature of the synthesis or higher, say 200° C. to 250° C., a dewaxing and a partial restoration of the activity of the catalyst will be obtained.

When the above described dewaxing with an inert gas is employed the restoration of the activity of the catalyst is less complete. Furthermore, the utilization of hot hydrogen gas to reactivate the catalyst appears to affect in some manner the surficial character of the catalyst so that before synthesis operation can again be obtained, the catalyst must be subjected to an induction period, during which period hydrogen and oxides of carbon are passed over the catalyst at a temperature below the temperature employed in the synthesis operation, and principally methane is formed. It is believed that the function of the induction period is to form a layer of metal carbide on the catalyst, which layer, in turn is an effective agent in the subsequent hydrocarbon synthesis. It appears, therefore, that activation treatment of deactivated catalyst with hydrogen at high temperature removes this carbide layer since an induction period is necessary after such treatment to restore the catalyst to its former specific nature.

The primary object of the present invention is the provision of novel methods and means whereby catalysts employed in the described hydrocarbon synthesis can be restored to or maintained in a high state of specific activity including the regeneration of the active surficial nature of the catalyst, and whereby such reactivation can be obtained without destroying the layer of metal carbide or other active characteristic of the catalyst which would otherwise have to be restored in a prolonged induction period.

Another object of the invention is the provision of a simple method for the restoration of the surficial activity of a deactivated catalyst which has been dewaxed by the use of a solvent or a hot inert gas.

A further object of the said invention is a provision of an improved method of hydrocarbon synthesis employing a recirculated fluid catalyst whereby a high level of conversion can continuously be obtained.

The invention has for further objects such other operative advantages or results as may be found to obtain in the processes or apparatus hereinafter described or claimed.

Briefly stated, the present invention consists in bringing into contact with deactivated catalyst hydrogen gas at relatively low temperature and thereby effecting a restoration to its former specific activity. The low temperature hydrogen treatment may be applied after a dewaxing step for the removal of heavy hydrocarbons from the surface of the catalyst by dissolving the wax in a solvent such as benzol or by treatment with hot inert gas such as nitrogen; or, in some instances, the hydrogen treatment at temperatures below those used in the synthesis may be employed alone to provide reactivation of the said catalyst. The described hydrogen treatment at moderate temperatures provides an especially high activity in the catalyst during the first hours of synthesis operation and is therefore particularly well adapted to that synthesis process in which the catalyst is employed in a highly comminuted state, and is circulated, as a fluid in the synthesis gas through the reaction zone and through a catalyst- and synthesis-products separating zone. The separated catalyst is thereafter returned to a stream of additional synthesis gas and is therewith flowed into the said reaction zone. In combination with such a cyclic process, the high activity of reactivated catalyst during the first few hours of synthesis reaction provided by the hydrogen treatment of the invention is particularly beneficial since it can be continuously restored by recirculative treatment whereby the catalyst is constantly at the said high state of activity.

It has furthermore been found that control of the initial reduction period, especially in respect of the temperature of the hydrogen employed in the said reduction, will provide a catalyst of such ratio of metal to metal oxide that the said catalyst will be particularly susceptible to the hydrogen treatment. The combined factors of the described hydrogen reactivation period and the temperature control during the initial reduction period provide an enhanced catalytic activity that especially in the continuous recirculated-catalyst process provides high yields and is of marked economic utility.

The accompanying drawing forming a part of this specification and showing for purposes of exemplification the preferred apparatus and method in which the invention may be embodied and practiced, but without limiting the claimed invention specifically to such an illustrative instance or instances, the figure is a flow sheet or diagrammatic elevational view partly in vertical cross section of apparatus for the synthesis of normally liquid hydrocarbon from hydrogen and oxides of carbon in which the employed catalyst is continuously recirculated.

Referring now the drawing, synthesis gas containing oxides of carbon, predominantly carbon monoxide, and hydrogen in a ratio from 1.5 to 1 to a ratio of 0.3 to 1 is passed into a catalytic converter 2 through a line 6 into a blending line 4 through which also may be returned recirculated effluent from converter 2. The carbon monoxide and hydrogen which may have been manufactured in a water gas set or other suitable means are delivered to the process-apparatus herein described through line 8 and thence into a heater 10. The gases which have been heated in heater 10 flow therefrom through a line 12 and thereafter into line 6 in which they are mixed with finely powdered catalyst which is delivered by a star feeder 14 from storage means therefor. Mixed gases and suspended catalyst flow from the said blending pipe 4 into the converter 2 which contains vertically disposed reactor tubes 16. It has been found preferable to operate with a relatively high linear vapor velocity in the reactor tubes in order to provide a better distribution of catalyst throughout the entire length of the tube and a turbulent condition of suspended catalyst, which favors uniformity of temperature conditions especially in reference to the surface of the catalyst and an improved heat transfer indirectly through the walls of the tube. A preferred space velocity has been found to be between 500 and 5,000 volumes of gas under standard conditions per volume of catalyst tube space per hour. Therefore in reactor tubes of from 2" to 4" in internal diameter and of approximately 20' to 30' in length, it is preferable to use space velocities of from 2,000 to 4,000, or preferably about 3,000, volumes of gas measured at standard conditions per volume of catalyst tube space per hour. The vapor velocity of the synthesis gas is sufficiently low that the catalyst will tend to remain in the catalyst tube longer than that volume of gas with which it was introduced into the converter, but it is also sufficiently high that the catalyst will be maintained in a suspended dispersion throughout the entire vertical lengths of the reactor tubes. The reactor tubes 16 are surrounded and cooled by a cooling fluid, such as water, which is delivered through an inlet pipe 18 and is expelled through outlet pipe 20.

The effluent from the converter 2 which comprises unconverted synthesis gases, converted hydrocarbon products, and suspended catalyst powder, is withdrawn from the converter through a line 22 and a major portion thereof may be recycled through a line 24 containing a valve 26 to the said converter 2 by means of centrifugal pump 28. A heat regulating means 30 is disposed in the line 24 between the said centrifugal pump 28 and the converter. Said heat regulator means 30 so maintains the temperature of the recycled gases, which are bled at a measured rate into the blending zone of the line 4 by regulation of the valve 32, also disposed in the line 24, that the gaseous admixture and suspended catalyst enters the converter at controlled temperature. In the instance of operation in which cobalt is used as the catalyst, the inflowing gases are maintained at a temperature between 180° and 220° C.

A minor portion of the effluent stream of unconverted synthesis gas, product gases, and catalyst from the converter 2 is flowed through a line 34 and is passed therefrom through a series of centrifugal separators 36, 38 and 40. The separators function to separate suspended catalyst powder from synthesis and product gases. They are operated at high temperature to prevent product condensation or moistening thereby, and consequent agglomeration, of the separated catalyst.

The separated catalyst flows downward from the separator 36 into a dewaxing chamber 42 and from separators 38 and 40 through a chute 44 into the said chamber. Hot gas, at a temperature from 200° to 400° C. is flowed into the chamber 42 through a pipe 46 and up through the chamber counter-currently to the descending catalyst powder therein. This flow of hot gas serves simply as an inert heat transfer medium to dewax the surface of the catalyst. Hydrogen can be used at a lower temperature within the stated range in which case the hydrogen, being only briefly in contact with the catalyst and at the said lower temperature, acts simply as an inert, heat-carrying gas. The dewaxing step need not be operated constantly during the continuous process of catalysts but only when some waxy material has accumulated on the catalyst surface.

An advantage of using hydrogen is that there is no loss of the gas since after it has passed through the dewaxing chamber 42 it may be flowed through a valved line 48 into the stream of gases in pipe 34 and thence be recirculated to the converter 2 and be used in the manufacture of a further quantity of hydrocarbons. Nor is there loss of suspended catalyst since any of it which may be carried out of chamber 42 is also recirculated with the said hydrogen.

Another advantage secured by the use of hydrogen in chamber 42 is that when no dewaxing is necessary, the chamber can be used as a preliminary cold-hydrogen treating zone and hydrogen can be passed from pipe 46 at preferably a temperature of about 50° C. into countercurrent contact with descending catalyst.

The catalyst can, as an alternative method, be dewaxed by treatment in the chamber 42 with a solvent in which case the resultant slurry of catalyst and solvent can continuously be centrifugalized and thereafter filtered and dried by known apparatus not shown.

Catalyst is fed from the bottom of the chamber 42 by a gas-sealed feeder 50 into a cooler 51 having inlet and outlet pipes 52 and 53 respectively for cooling fluid. Cooled catalyst is delivered therefrom by a star feeder 54 into a regenerator chamber 55 in which the finely divided catalyst rests loosely upon a supporting grill 56.

Cold hydrogen is introduced through a valved pipe 57 into the said chamber 55 and therein flows upwardly through interstices in the said grill 56 and through accumulated catalyst particles resting thereon. The hydrogen is passed through the said chamber 55 at very low velocity and therefore carries with it substantially no suspended catalyst. The hydrogen passes around a baffle 58 that is arranged in the upper part of said chamber 55 and escapes therefrom through a valved line 60.

The hydrogen in the regenerative chamber 55 serves the function, by flowing through the accumulated catalyst, of maintaining the same in a finely divided, unpacked state, of providing a storage atmosphere that is reducing, and, most importantly, of restoring the surficial activity of the catalyst which is believed to be provided by an adherence of hydrogen molecules thereto. A preferred embodiment of invention contemplates a hydrogen temperature in the chamber 55 of about 50° C. The catalyst passes so slowly through the said chamber that it remains in contact with hydrogen for the relatively long period of from 0.5 to 5 hrs. Unconsumed hydrogen passing from the chamber 55 through the pipe 60 can be recycled to the said chamber 55 and be flowed through line 57 thereinto. Since very little production of other products occurs in the chamber 55, hydrogen can be recirculated until, after a long period, it has become contaminated by the accumulation of minor by-products of regeneration. Reactivated catalyst flows slowly through the grill 56 and is recycled to the catalytic converter 2 by means of the star feeder 14 from which it is delivered into the said pipe 4.

Synthesis and hydrocarbon products of catalysis flow from the third centrifugal separator 40 through a line 62. These gases may contain a minute amount of suspended catalyst dust. Consequently special dust separating means 64 is provided, which means may be simply a baffle tank in which the velocity of the gas is considerably reduced, or, in case the employed catalyst contains reduced iron or a magnetic oxide content the separating means may be magnetically operated and comprise plates carrying induced magnetic charges. Separated catalyst dust may be periodically withdrawn from the separating means 64 through a pipe 66. A by-pass around the separator 64 is provided by a valved pipe 68.

Synthesis and hydrocarbon gases flow from the separator 64 or the by-pass line 68 to valved pipe 70 into a condenser 72 which is supplied conventionally with inlet and outlet water pipes 74 and 76, and in which heavier hydrocarbon products are condensed. The condensate and condensed gases are flowed from the condenser 72 through a line 78 into a separator 80, in which the condensate collects and separates into layers. A lower aqueous layer which contains a small amount of alcohol is drained from the separator through a pipe 82, and its upper layer which contains hydrocarbon oils is flowed from the separator 80 through a valved line 84 to storage.

Unconverted synthesis gases, uncondensed gaseous products such as methane, and hydrocarbon vapors flow from the separator 80 through a gas line 86 into an oil scrubber 88 in which the said gases rise in countercurrent flow to a descending flow of absorbent heavier hydrocarbon oil. Substantially all those hydrocarbons heavier than methane which are contained in the delivered gases are absorbed in the scrubber 88 by the absorbent hydrocarbon oil. The enriched absorbent oil from scrubber 88 flows through a valve line 90 into a stripper 92 having a reboiler steam coil section 94. Therein the absorbed hydrocarbons are recovered substantially completely by vaporization. The so-liberated lighter hydrocarbons flow from the stripper 92 through the valved pipe 96 to storage means, not shown. Absorbent oil from which a lighter hydrocarbon has been stripped is returned through line 98 and valved line 100 to the said scrubber 88. A valved line 102 is provided for removal of heavy oil.

Unabsorbed gases comprising substantially only hydrogen and oxides of carbon and, in minor amounts, methane are flowed from the scrubber 88 through a valved pipe 104 whence it can be recirculated to the conversion system through a valved line 108 by means of a centrifugal pump 109 disposed therein or, whenever the hydrogen and carbon monoxide has become over-contaminated with methane or inert gases, it can be vented to combustion or storage means by opening valve 110 disposed in a line 112.

The feature of recirculation of catalyst and conversion gases as described in the above given preferred embodiment of invention has an important advantage in that great flexibility of operation is thereby obtained. The linear velocity in the catalyst tubes of the synthesis gases is very critical, since it is related not only to the efficiency whereby the powdered catalyst is maintained in contact with the reacting gases, but also to the dissipation of the exothermic heat of reaction. The optimum linear velocity depends upon the particle size of the catalyst, the density of the gases, and the turbulence required. In general more turbulence is required for heat removal from especially active catalysts. The optimum linear velocity through the vertical tubes can be maintained at a pressure most advantageous for optimum operation by means of the controlled recirculation of a desired fraction of the total effluent gases. By heating or cooling the described recirculated stream of synthesis and hydrocarbon gases, and suspended catalyst, it is possible to control the inlet temperature of gases to the converter within narrow limits.

The catalytic converter 2 is preferably operated under pressures of one to fifteen atmospheres. When a catalyst comprising cobalt is employed, optimum pressures are between one to three atmospheres, whereas when iron or iron oxide is employed in the catalyst a higher pressure is of advantage.

The following specific examples are reported for the purpose of illustrating the invention:

Example I

A cobalt-type catalyst which had been employed in hydrocarbon synthesis for a period of eight weeks and which thereafter had been dewaxed at 260° C. exhibited in further synthesis operation a conversion efficiency calculated on the basis of reduction in volume of the synthesis gases of 31%. Thereafter a reactivation of the catalyst by treatment thereof with hydrogen at 190° C. for one hour increased the average efficiency of the catalyst in subsequent synthesis operation to 34.5%. A second reactivation treatment of the catalyst with hydrogen at 25° C. for eight hours increased the average efficiency of the catalyst to 45% with an initial peak efficiency as volume reduction of approximately 50%. A further reactivation of the catalyst which had become deactivated to an efficiency of 30%, with hydrogen cooling the catalyst to 25° C., and for 50 hours, increased the average efficiency in subsequent synthesis operation to 46.5%.

Example II

A deactivated cobalt-type catalyst was treated with hydrogen by the previously known method of employing the activating hydrogen at the high temperature of 240° C. An increase in catalyst efficiency was obtained, but such increase was short-lived, the efficiency in volume reduction dropping rapidly during the first period of subsequent synthesis operation. A second reactivation of the catalyst by the method of invention with hydrogen at room temperature increased the initial efficiency of the catalyst to a volume reduction of 70%. An average efficiency of this catalyst of over 50% persisted for over forty hours. A test in the nature of a blank run in which carbon monoxide instead of hydrogen was employed under conditions identical to those obtaining in the above described cold-hydrogen reactivation was found to reduce the catalyst efficiency approximately 7%.

When deactivated catalyst is pretreated with hydrogen at an elevated temperature before the cold-hydrogen treatment of invention and such pretreatment is for but a brief period so that only a minor portion of the surficial metal carbide is converted to metal, the activity of the catalyst in subsequent conversion synthesis is very high and excessive methane production periods and induction periods are avoided.

An advantageous feature of the described preferred embodiment of invention is the fact that a continuous operation of the catalytic converter results. A further important advantage is that a substantial reduction in the rate of deposition of waxy material on the catalyst is found to obtain when catalyst which has been reactivated by treatment with cold hydrogen is thereafter employed in hydrocarbon synthesis. The catalyst may be continuously or intermittently dewaxed without interruption of the normal synthesis.

The invention as hereinbefore set forth is embodied in particular form and manner but may be variously embodied within the scope of the claims hereinafter made.

I claim:

1. In a cyclic process of catalytic synthesis of normally liquid hydrocarbons from hydrogen and carbon monoxide comprising, the step of passing hydrogen and carbon monoxide gases into a synthesis zone in which the temperature is at least about 180° C. and therein reacting the same in the presence of a high activity powdered solid hydrogenation catalyst selected from the group consisting of nickel, cobalt, iron and their oxides, suspended in said gases and forming an active metal carbide layer on said catalyst, the step of removing said catalyst from said synthesis zone after a period of synthesis reaction with consequent reduction in catalytic activity to an efficiency of about 30% normal activity as measured by percentage volume reduction in catalyzed gases and introducing the deactivated catalyst into direct contact of a stream of hydrogen gas at a temperature of about 50° C. for a period of 0.5 to 5.0 hours to thereby regenerate the activity of the catalyst without destruction of the carbide layer on the surface of the catalyst to prepare it for return to the synthesis zone.

2. In a cyclic process of catalytic synthesis of normally liquid hydrocarbons from hydrogen and carbon monoxide comprising, the step of passing hydrogen and carbon monoxide gases into a synthesis zone in which the temperature is at least about 180° C. in the presence of a high activity powdered solid hydrogenation catalyst selected from the group consisting of nickel, iron, cobalt and their oxides, suspended in said gases and forming an active metal carbide layer on said catalyst, the step of removing said catalyst from said synthesis zone after a period of synthesis reaction with consequent reduction in catalytic activity to an efficiency of about 30% of normal activity as measured by percentage volume reduction in catalyzed gases, and introducing the deactivated catalyst into direct contact of a stream of hydrogen at a temperature of about 25° C. for a period of eight to fifty hours to thereby regenerate the activity of the catalyst without destruction of the carbide layer on the surface of the catalyst to prepare it for the return of the catalyst to the synthesis zone.

EDMOND L. D'OUVILLE.

REFERENCES CITED

The following references are of record in the file of this patent:

UNITED STATES PATENTS

| Number | Name | Date |
|---|---|---|
| 1,896,031 | Reynolds | Jan. 31, 1933 |
| 2,234,246 | Groombridge | Mar. 11, 1941 |
| 2,238,726 | Fiesst | Apr. 15, 1941 |
| 2,251,554 | Sabel | Aug. 5, 1941 |
| 2,259,961 | Myddleton | Oct. 21, 1941 |
| 2,360,787 | Murphree | Oct. 17, 1944 |